United States Patent [19]
Kiezel

[11] 3,807,889
[45] Apr. 30, 1974

[54] SELF CENTERING DRILLING JIG

[76] Inventor: George Kiezel, 3216 Norstrom Way, Sacramento, Calif. 95833

[22] Filed: Apr. 24, 1973

[21] Appl. No.: 354,103

[52] U.S. Cl............................. 408/108, 408/109
[51] Int. Cl............................................ B23b 49/00
[58] Field of Search ........... 408/103, 108, 109, 115; 269/87.3

[56] References Cited
UNITED STATES PATENTS
2,783,665  3/1957  Saunders............................ 408/108

*Primary Examiner*—Francis S. Husar
*Attorney, Agent, or Firm*—Lothrop & West

[57] ABSTRACT

In order to drill a hole in the exact transverse center of an elongated object, such as a pipe or the edge of a pair of boards to be joined by dowels, a spaced pair of pivoted crosses is expanded and contracted in response to movement of a pair of spaced parallel channels confining the crosses. Channel movement is controlled by a clamp screw acting in conjunction with spring means urging the channels apart. The ends of the arms of each cross carry locator pins equidistantly spaced from the pivot axis so that as the locator pins snugly embrace both sides of the object to be drilled, the pivot axis is automatically centered. A tube coincident with the pivot axis of each cross provides a guide for a drill. The locations of the pivot axes relative to either of the ends of the object are selectively adjusted by means of an auxiliary frame carrying indicator pins at each end.

6 Claims, 4 Drawing Figures

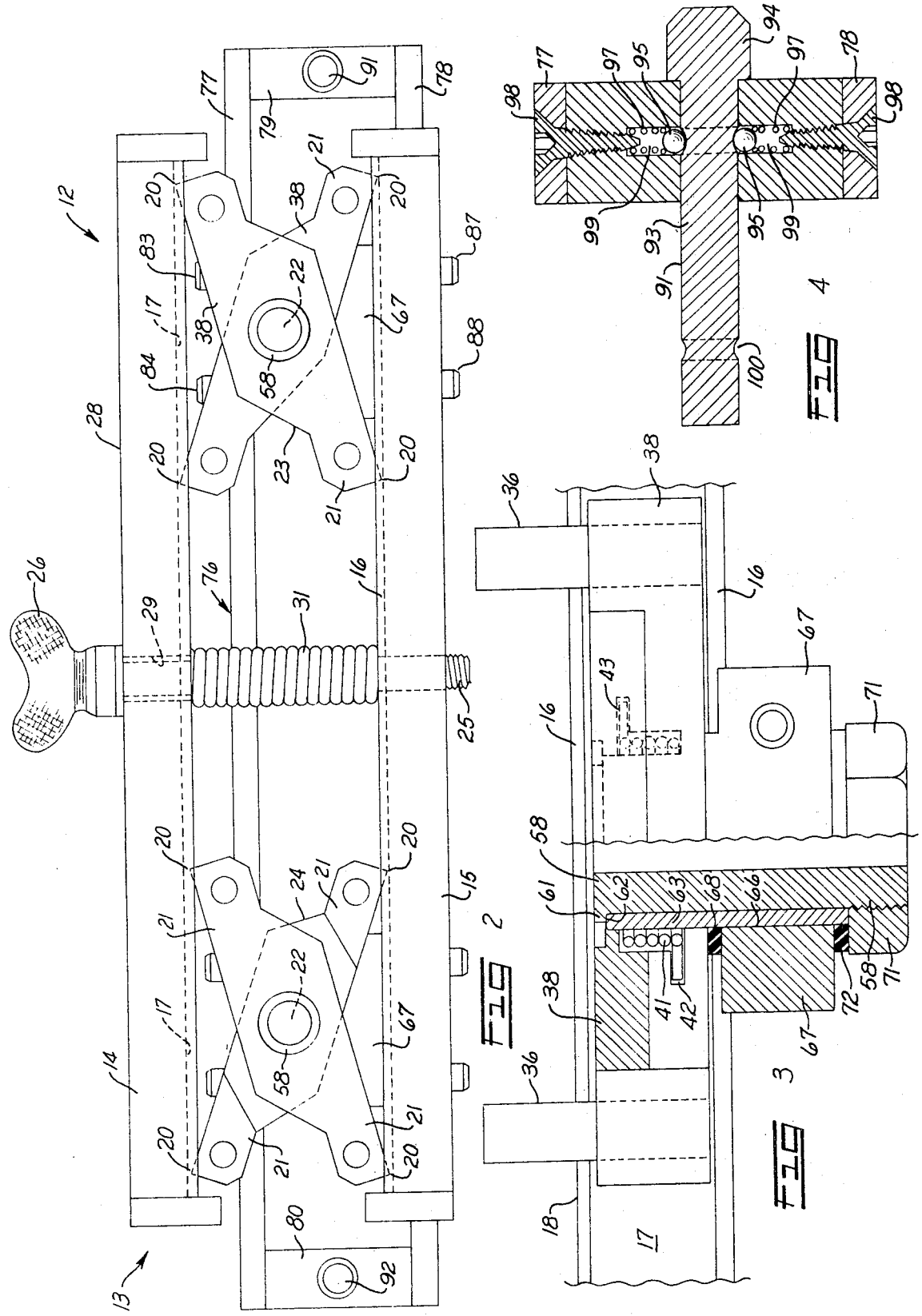

SELF CENTERING DRILLING JIG

A related application, Ser. No. 253,476 filed May 15, 1972, in the name of George L. Kiezel is hereby abandoned. By change of name, applicant's middle name has been dropped and his true, full and correct name is now George Kiezel.

The invention relates to improvements in self-centering devices for marking or drilling an elongated object having parallel sides, such as a pipe or boards to be joined by dowels.

One of the major difficulties in preparing a pair of boards to be joined by dowels so as to form a table top, for example, is that of locating the holes so that they will be in accurate register for placement of the dowels preparatory to gluing. Despite the fact that both the market place and the patent literature include numerous devices which are intended to accomplish the desired result, there is considerable room for improvement.

It is therefore an object of the invention to provide a drilling jig which is automatically self centering.

It is another object of the invention to provide a drilling jig which is economical, compact and light in weight, yet is rugged, reliable and easy to operate.

It is a further object of the invention to provide a drilling jig which is versatile in that it can be used with vertually any elongated object having parallel sides, such as boards, pipes, bars, rods, channels, and the like.

It is yet a further object of the invention to provide a drilling jig wherein the marks or holes can be accurately located in spaced relation on a longitudinal median plane of the object, not only with respect to the distance between the holes but also the distances from the ends of the object to the respective holes.

It is still a further object of the invention to provide a drilling jig which is readily adaptable to accommodate drills of different sizes.

It is another object of the invention to provide an improved self centering drilling jig.

Other objects, together with the foregoing, are attained in the embodiment described in the following description and illustrated in the accompanying drawings, in which:

FIG. 2 is a rear elevational view, showing the crosses in expanded position;

FIG. 3 is a top plan view, to an enlarged scale, of a locator block and cross arm unit, with portions being shown in section, the plane of the section being indicated by the line 3—3 in FIG. 1; and, FIG. 4 is a sectional view, to a greatly enlarged scale, of one of the indicator pins located on the auxiliary frame, the plane of the section being indicated by the line 4—4 in FIG. 1.

Figure 1:
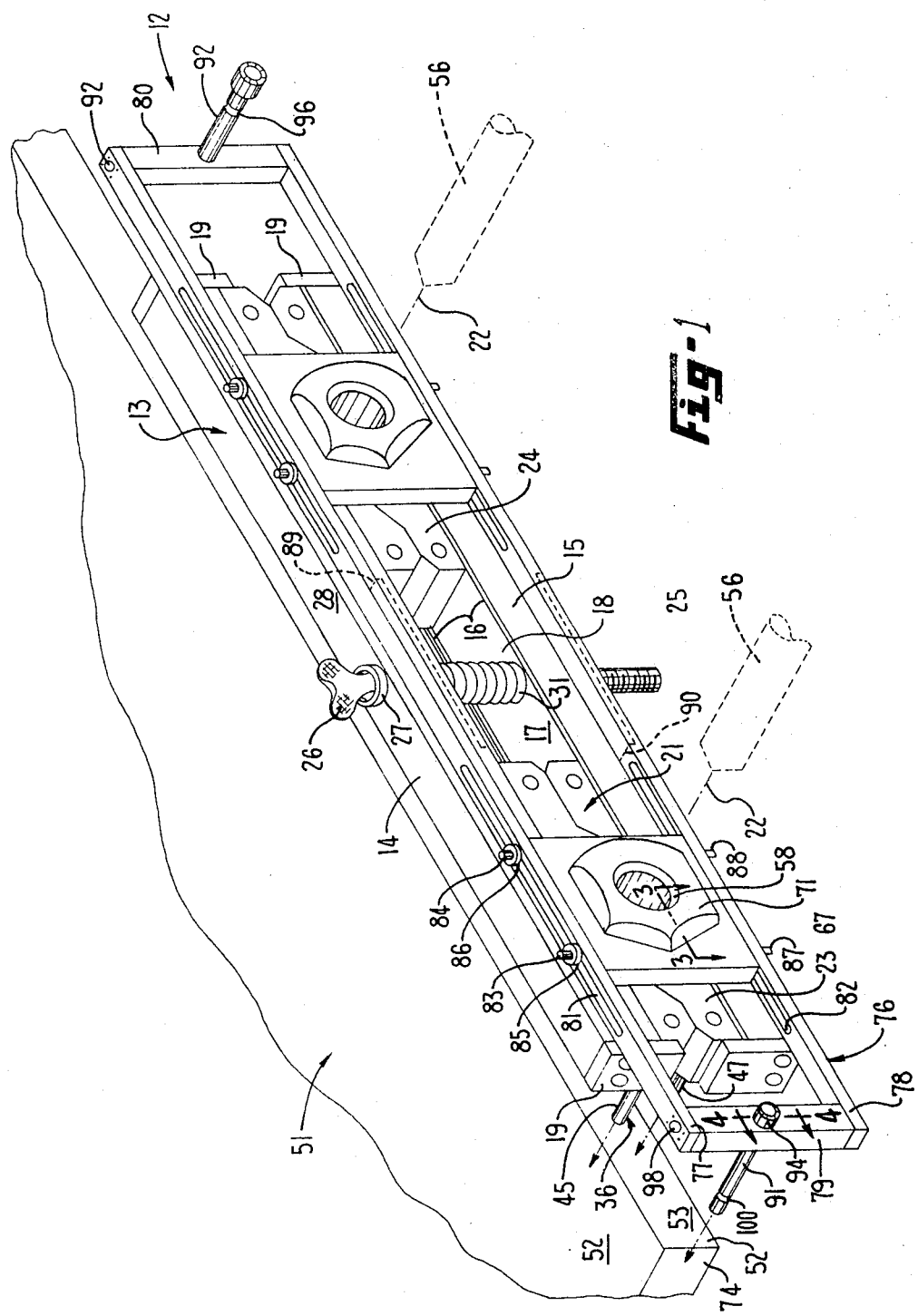
FIG. 1 is a front, left perspective view showing the jig preparatory to spreading the frame channels and thereby expanding the pivoted crosses and attendant locator pins to enable the pins to embrace both sides of an adjacent board, shown in fragmentary fashion.

While the drilling jig of the invention is susceptible of numerous physical embodiments, depending upon the environment and requirements of use, the herein shown and described embodiment provides very satisfactory results.

The drilling jig of the invention, generally designated by the reference numeral 12, comprises an elongated primary frame 13 including a spaced pair of parallel channels, namely an upper channel 14 and a lower channel 15, which are substantially U-shaped in cross section, with the openings of the U in opposite channels facing each other. The edges 16 of the U, in other words, form, in conjunction with the planar base 17 of the U, a track 18. Mounted on the ends of the track 18 are limit stops 19.

Riding in the two opposite tracks 18 are the four shoes 20, or sliding surfaces, at the extreme ends of the four arms 21 forming an X-shaped cross pivoted on a central pivot axis 22.

There are two of such crosses, 23 and 24, interposed between the channels 14 and 15, the crosses being spaced apart any selected distance and clamped in place between the two channels 14 and 15 by a clamp screw 25 traversing both channels, as appears most clearly in FIGS. 1 and 2.

The clamp screw includes a wing-shaped head 26 engaging a "Teflon" washer 27 on the top surface 28 of the upper channel 14; and while the screw threads engage the threads of a tapped opening in the lower channel 15, the upper end of the screw, adjacent the head 26, is loosely encompassed by the walls of an opening 29 in the upper channel 14 so that the upper channel 14 can move up or down relative to the screw. A compression spring 31 encompasses the clamp screw 25 and is interposed between the track bases 17. The two channels 14 and 15 are thereby urged away from each other.

In order to move the two channels toward each other, and thereby force the crosses 23 and 24 into contracted attitude, the clamp screw 25 is rotated in a clockwise direction when viewed from the top. To separate the channels and thereby expand, or spread, the crosses, the clamp screw is rotated in the opposite, or counter-clockwise direction, viewed from on top, the compression spring 31 being effective to bias the upper channel 14 away from the lower channel 15 as the screw is rotated and thus spread the channels apart.

As the channels 14 and 15 spread apart, the crosses 23 and 24 expand in unison, carrying with them a plurality of locator pins, generally designated by the reference numeral 36, the pin being mounted adjacent the ends of the four cross arms 21.

Since each of the crosses 23 and 24 is substantially identical in construction and operation, a description of one will also serve to describe the other.

With particular reference to the cross 23, it will be noted that the four arms 21 of the cross are actually two crossed levers 38 arranged in mirror symmetry. The two levers are pivotally connected for rotation about the pivot axis 22 in the nature of a pair of scissors. The crossed levers 38 are formed with matching physically offset portions so as to decrease the axial extent of the cross, as can be seen most clearly in FIG. 3.

The distal ends of each of the four arms 21 of the cross form, as previously mentioned the shoes 20 which ride in their respective opposed tracks 18; and as the channels are opened or closed by operation of the clamp screw 25, the shoes slide to or fro along the tracks while, at the same time, the cross 23 itself remains fixed in place relative to the primary frame 13.

An internal follower spring 41 having one end anchored in a recess 42 in one cross lever and the other end anchored in a recess 43 in the other cross lever biases the two levers 38 into expanded attitude so that as the channels are spread by operation of the clamp screw and the compression spring 31, the crosses are themselves urged into expanded position.

As the cross opens and closes, the opposed pairs of locator pins 36 are correspondingly moved away from and toward each other respectively.

Each cross, as previously indicated, carries four locator pins 36. The locator pins 36 are located adjacent the ends of the four cross arms 21 and are spaced equidistantly from the pivot axis 22 of the cross so that the pins move to and fro in mirror symmetry relative to the pivot axis and, more particularly, to a median longitudinal plane passing through the pivot axis 22 in an attitude normal to the plane including the two channels 14 and 15.

In other words, as the crosses are opened and closed, the two upper pins 44 and 45 move up and down while the respective lower pins 46 and 47 concurrently move down and up. The extent of opposite motion of the two pairs of pins is identical, with the result that the pivot axis 22 always remains centered relative to the pins.

This automatic centering effect enables the jig to be used either to mark on, or to drill into, the exact transverse center of an elongated object 51, such as a board, having parallel opposite sides 52. In other words, by appropriately adjusting the clamping screw 25 so that the opposed pairs of locator pins 36 on each of the crosses snugly embraces the respective opposite sides 52 of the elongated object 51 the adjacent edge 53 of the object can readily be marked, or drilled, in the exact transverse center. A drill 56, for example, can be introduced into a tubular guide 58, or bushing, having an axis coincident with the pivot axis 22 and be guided thereby into engagement with the exact center of the edge 53 of the board.

Two such drilled holes can initially be formed in the edge of the board by drilling first through one cross 23 and then through the other cross 24. After the first two holes are drilled, the entire jig 12 is translated endwise so that one of the guide tubes 58 is in register with one of the holes just drilled. Then, a short length of dowel can temporarily be inserted into the registering guide tube and hole while the new hole is being drilled. After the new hole is drilled, the dowel is removed and the jig again moved along the edge 53 until the trailing guide tube is in register with the hole just drilled. At this juncture, the dowel is inserted into the registering tube and hole while the new hole is drilled. This cycle is repeated until all the desired holes have been drilled.

The operation is then repeated on the mating board (not shown) which is to be doweled and glued to the board shown herein.

The space between the dowels (i.e., the space between the two pivot axes 22 of the two crosses 23 and 24) is controlled by moving the crosses toward or away from each other. This relative movement of the crosses in the tracks is most readily accomplished by so moving the clamp screw as to spread the channels quite widely apart, with the crosses correspondingly widely spread. The resistance to translational, or sliding, movement of the crosses toward and away from each other is at a minimum under these conditions, thereby permitting them to be set at any desired location. The crosses 23 and 24 are then contracted into normal operating position by the screw clamp 25 and marking or drilling can be resumed with the new spacing.

As appears most clearly in FIG. 3, the bell-mouthed guide tube 58, or bushing, is interchangeable to accommodate drills of any desired size. Preferably, the guide tube 58 includes a flange 61 on its inner end affording a shoulder 62 against which abuts a liner 63 lodged in a bore 66 passing through a locator block 67 held in spaced relation relative to the adjacent cross arms by a "Teflon" washer 68. The outer end of the guide tube 58 projects outwardly beyond the liner 63 and is exteriorly threaded to receive a nut 71, the nut 71 being held in spaced relation to the underlying locator block 67 by another "Teflon" washer 72.

In order to replace the guide tube 58 shown with a guide tube having another internal diameter, but identical external diameter, the nut 71 is removed, allowing the tube 58 and the liner 63 to be withdrawn. A replacement tube, having the same outside diameter but different inside diameter, as desired, is thereupon inserted with the liner 63 in the bore 66 and the nut 71 is screwed in place and operations can be resumed.

As can be seen, the liner 63 serves, in effect, as an axle on which the cross levers 38 are pivoted, and since the axes of the liner 63 and the guide tube 58 are coincident with the pivot axis 22 of the cross, the drill is constrained to engage the underlying edge of the elongated object 51 at the exact transverse center, regardless of the width of the object.

In order to position the pivot axes 22 of the crosses 23 and 24 at the desired location relative to an end 74 of the object to be drilled, an elongated auxiliary frame 76 is provided. The auxiliary frame 76 is rectangular in shape and includes a top bar 77 and a bottom bar 78 connected at their ends to a pair of end blocks 79 and 80.

The auxiliary frame 76 is movable lengthwise to the primary frame 13 by reason of a pair of slots 81 and 82 in the upper bar 77 and the lower bar 78, respectively. Two hex socket head cap screws 83 and 84 extend through the upper slot 81 into threaded engagement with the underlying locator block 67 and as the screws 83 and 84 are tightened, clamping is effected as the screw caps bear down on the respective interposed washers 85 and 86 spanning the slot 81. In like fashion, two similar screws 87 and 88 pass upwardly through the lower slot 82 into threaded engagement with the overlying locator block 67.

Both of the locator blocks 67 are thus clamped to the auxiliary frame 76; and when the auxiliary frame 76 is to be moved endwise in either direction, it is merely necessary to loosen the cap screws, shift the auxiliary frame 76 to the desired position and tighten the cap screws.

If desired, the top bar 77 and bottom bar 78 of the auxiliary frame 13 could each be made of two parts with separate complimentary overlapping and offset portions as indicated by the respective broken lines 89 and 90 in FIG. 1. This construction enables the two ends of the auxiliary frame 76 to be shifted independently, within reasonable limits.

Slidably mounted in each of the end blocks 79 and 80 of the auxiliary frame is an indicator pin 91 and 92, respectively. Both indicator pins are substantially identical and the following description therefore applies equally to both.

The indicator pin 91 includes an elongated rod portion 93 surmounted by an enlarged head 94 on the outer end to serve as a limit stop when the indicator pin is projected fully inwardly as appears on the left hand end of FIG. 1.

The indicator pin 91 is held in place by a ball detent structure including an opposed pair of steel balls 95 urged into engagement with an annular recess 96 in the pin walls by a pair of compression springs 97 biased by an opposed pair of flat head hex socket screws 98 extending through the upper and lower bars 77 and 78 into the interposed end block and into the respective spring and ball chambers 99.

By projecting the indicator, or end, or base pin 91 inwardly, as shown on the left hand end of the auxiliary frame in FIG. 1, and spreading the two crosses so that the eight locator pins snugly embrace the two sides of the board, the jig can be located so that the end pin 91 touches the adjacent end 74 of the board. Having previously positioned the end pin 91 in the desired location relative to the pivot axes 22, the placement of the pin 91 against the end 74 of the board automatically locates the guide tubes 58 in the proper position, lengthwise, against the underlying edge 53 of the board, and since, as previously described, the guide tubes are automatically transversely centered, drilling can immediately be effected with the assurance that the drilled holes will be in the precise location desired.

In order to shift the jig endwise after the first two holes are drilled, the pin 91 is retracted outwardly to assume the position of the pin 92 on the right hand end of the jig as shown in FIG. 1. In this retracted, or withdrawn, position the balls 95 are urged into a second annular recess 100 adjacent the inner end of the indicator pin. Thus, the inner end of the pin is substantially flush with the inner surface of the auxiliary frame and does not interfere with the endwise movement of the jig as it is moved along the length of the object as drilling proceeds. At the same time, the pin is held securely in place, ready for use in the next cycle of operation.

It can therefore be seen that I have provided a self centering jig which is not only efficient, and versatile, in that it can be used in connection with marking or drilling a wide variety of elongated objects, but which is also convenient to use since it is entirely self contained.

What is claimed is:

1. A self centering drilling jig comprising:
   a. an elongated primary frame including a pair of channels defining a spaced pair of parallel tracks;
   b. a pair of crosses each including a crossed pair of lever arms interposed between said channels with the ends of said lever arms riding in said tracks and movable between a contracted position and an expanded position in dependence upon the extent of separation of said channels;
   c. spring means on said crosses for urging said crosses toward expanded position;
   d. clamping means on said primary frame for biasing said channels toward each other in opposition to said spring means and being effective to position said crosses in the desired degree of expansion;
   e. a plurality of locator pins mounted adjacent the ends of said lever arms, said pins projecting away from one side of said crosses parallel to the pivot axis of said lever arms in order to embrace the opposite faces of an elongated object to be drilled, said pins being spaced equidistantly from said pivot axis causing said pivot axis to intersect the median line of the object as said pins embrace said opposite faces; and,
   f. a tubular housing mounted coaxially on each of said crosses, the longitudinal axis of said bushing being coincident with said pivot axis, and the inside diameter of said bushing being such that said bushing is capable of accurately guiding a drill along said pivot axis and into the elongated object on the median line thereof.

2. A self centering drilling jig as in claim 1 wherein said clamping means includes a screw spanning said channels in a transverse direction and being in threaded engagement with at least one of said channels; and wherein said jig further includes a compression spring encompassing said screw, said compression spring being interposed between and bearing against said channels to bias said channels in a direction away from each other.

3. A self centering drilling jig as in claim 2 wherein said bushing is interchangeable to accommodate a plurality of drills of various sizes.

4. A self centering drilling jig as in claim 3 further including a locator block mounted on said bushing, and a nut engageable with threads on a portion of said bushing protruding from said block, said nut being capable of detachably connecting said block and said bushing.

5. A self centering drilling jig as in claim 4 further including an elongated auxiliary frame translatably mounted on said blocks parallel to said primary frame for selective longitudinal positioning of said auxiliary frame relative to said primary frame, and an indicator member on at least one end of said auxiliary frame to engage one end of the object to be drilled and thereby establish said primary frame at a base position relative to the object to be drilled.

6. A self centering drilling jig as in claim 5 in which said indicator member comprises an indicator pin translatably mounted on one end of said auxiliary frame parallel to said locator pins and being movable between a projected position for engagement with the end of the object to be drilled and a retracted position removed from the object.

* * * * *